(12) United States Patent
Byun et al.

(10) Patent No.: US 10,952,221 B2
(45) Date of Patent: Mar. 16, 2021

(54) RESOURCE ALLOCATION METHOD AND DEVICE FOR V2X COMMUNICATION

(71) Applicant: LG ELECTRONICS INC., Seoul (KR)

(72) Inventors: Daewook Byun, Seoul (KR); Myoungseob Kim, Seoul (KR); Hyukjin Chae, Seoul (KR); Jian Xu, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 16/083,716

(22) PCT Filed: Mar. 13, 2017

(86) PCT No.: PCT/KR2017/002650
§ 371 (c)(1),
(2) Date: Sep. 10, 2018

(87) PCT Pub. No.: WO2017/155361
PCT Pub. Date: Sep. 14, 2017

(65) Prior Publication Data
US 2020/0196296 A1 Jun. 18, 2020

Related U.S. Application Data

(60) Provisional application No. 62/306,647, filed on Mar. 11, 2016.

(51) Int. Cl.
*H04W 72/04* (2009.01)
*H04W 4/44* (2018.01)
(Continued)

(52) U.S. Cl.
CPC ........... *H04W 72/048* (2013.01); *H04W 4/44* (2018.02); *H04W 28/26* (2013.01); *H04W 36/0072* (2013.01); *H04W 72/0426* (2013.01)

(58) Field of Classification Search
None
See application file for complete search history.

(56) References Cited

U.S. PATENT DOCUMENTS

| | | | | |
|---|---|---|---|---|
| 2007/0249347 A1* | 10/2007 | Saifullah | ............... | H04W 36/38 455/436 |
| 2008/0084851 A1* | 4/2008 | Kim | .................... | H04W 72/048 370/336 |

(Continued)

FOREIGN PATENT DOCUMENTS

| WO | 2015096845 A1 | 7/2015 |
|---|---|---|
| WO | 2015113393 A1 | 8/2015 |
| WO | 2015115983 | 8/2015 |

OTHER PUBLICATIONS

Ericsson, "Sidelink Resource Allocation in V2X," R2-161566, 3GPP TSG-RAN, WG2 #93, Malta, Feb. 6, 2016, see pp. 3-9.

(Continued)

*Primary Examiner* — Alex Skripnikov
*Assistant Examiner* — Richard Schnell
(74) *Attorney, Agent, or Firm* — Dentons US LLP

(57) ABSTRACT

Provided are a method for executing vehicle-to-everything (V2X) communication by a base station in a wireless communication system and a device supporting same. The base station can; allocate a first resource set; transmit to a neighboring base station a UE resource reservation request message comprising information about the allocated first resource set; receive from the neighboring base station a UE resource reservation response message as a response to the UE resource reservation request message; and transmit a newly allocated second resource set to a terminal.

5 Claims, 11 Drawing Sheets

(51) Int. Cl.
*H04W 28/26* (2009.01)
*H04W 36/00* (2009.01)

(56) References Cited

U.S. PATENT DOCUMENTS

| | | |
|---|---|---|
| 2013/0102314 A1 | 4/2013 | Koskela et al. |
| 2014/0038653 A1 | 2/2014 | Mildh et al. |
| 2014/0235234 A1 | 8/2014 | Jang et al. |
| 2015/0103789 A1 | 4/2015 | Tanaka |
| 2015/0201401 A1 | 7/2015 | Lahetkangas et al. |
| 2016/0330728 A1* | 11/2016 | Sorrentino .......... H04W 72/048 |
| 2016/0345307 A1 | 11/2016 | Huang et al. |
| 2017/0019822 A1* | 1/2017 | Zhao ..................... H04W 36/08 |
| 2018/0234898 A1* | 8/2018 | Kahtava .................. H04W 4/44 |

OTHER PUBLICATIONS

LG Electronics Inc., "Challenges and Potential Enhancements for Uu Based V2V," R2-161795, 3GPP TSG-RAN WG2 #93, St. Julian's, Malta, Feb. 19, 2016, see pp. 1-3.

* cited by examiner

RESOURCE ALLOCATION METHOD AND DEVICE FOR V2X COMMUNICATION

CROSS-REFERENCE TO RELATED APPLICATIONS

This application is the National Stage filing under 35 U.S.C. 371 of International Application No. PCT/KR2017/002650, filed on Mar. 13, 2017, which claims the benefit of U.S. Provisional Application No. 62/306,647 filed on Mar. 11, 2016, the contents of which are all hereby incorporated by reference herein in their entirety.

BACKGROUND OF THE INVENTION

Field of the Invention

The present invention relates to a wireless communication system and, more particularly, to a method for allocating resources for V2X communication by a base station (BS) (i.e., eNB) and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D UE may perform data communication with a high transmission rate and low delay. Further, the D2D operation may distribute traffic converged in a base station. If the D2D UE serves as a relay, the D2D UE may serve to extend coverage of a base station.

SUMMARY OF THE INVENTION

A user equipment (UE) may be subjected to scheduling of resource for vehicle-to-everything (V2X) communication from a BS. That is, the BS may make a sidelink scheduling assignment (SA) and/or allocate a set of periodically occurring resources for data transmission. However, since the UE having mobility may change the BS, although the BS allocates the set of periodically occurring resources, the set of periodically occurring resources allocated by the BS may not be provided by a neighbor BS (i.e., a changed BS due to movement of the UE). In this case, the UE which has moved to an area of the neighbor BS may fail to perform V2X communication using the set of resources allocated by the BS. Thus, a method for performing V2X communication and a device supporting the same are required to be proposed.

In an aspect, a method for performing vehicle-to-everything (V2X) communication by a base station (BS) in a wireless communication system is provided. The method includes allocating a first resource set; transmitting a user equipment (UE) resource reserve request message including information on the allocated first resource set to a neighbor BS; receiving a UE resource reserve response message from the neighbor BS in response to the UE resource reserve request message; and transmitting a newly allocated second resource set to a UE.

The allocated first resource set cannot be served by the neighbor BS.

The UE resource reserve response message may include information on the newly allocated second resource set. The second resource set may be newly allocated by the neighbor BS.

The UE resource reserve response message may include an indication indicating that the allocated first resource set cannot be served by the neighbor BS. The method may further include: allocating the second resource set based on the indication. The method may further include: transmitting the allocated second resource set to the neighbor BS.

The first resource set and the second resource set may be periodically occurring resources for sidelink scheduling assignment (SA) or data transmission.

The allocated first resource set may be a plurality of first resource sets. At least any one of the plurality of first resource sets cannot be served by the neighbor BS.

In another aspect, a method for performing vehicle-to-everything (V2X) communication by a base station (BS) in a wireless communication system is provided. The method includes: receiving a user equipment (UE) resource reserve request message including information on a first resource set allocated by a neighbor BS from the neighbor BS; determining whether the allocated first resource set can be served by the BS; and transmitting a UE resource reserve response message to the neighbor BS in response to the UE resource reserve request message to the neighbor BS.

The method may further include: when it is determined that the allocated first resource set cannot be served by the BS, allocating a second resource set. The UE resource reserve response message may include information on the allocated second resource set.

When it is determined that the allocated first resource set cannot be served by the BS, the UE resource reserve response message may include an indication indicating that the allocated first resource set cannot be served by the BS.

In another aspect, a base station (BS) performing vehicle-to-everything (V2X) communication in a wireless communication system is provided. The BS includes: a memory; a transceiver; and a processor connecting the memory and the transceiver, wherein the processor may allocate a first resource set, control the transceiver to transmit a user equipment (UE) resource reserve request message including information on the allocated first resource set to a neighbor BS, control the transceiver to receive a UE resource reserve response message from the neighbor BS in response to the UE resource reserve request message, and control the transceiver to transmit a newly allocated second resource set to a UE.

According to the present invention, V2X communication may be smoothly performed.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
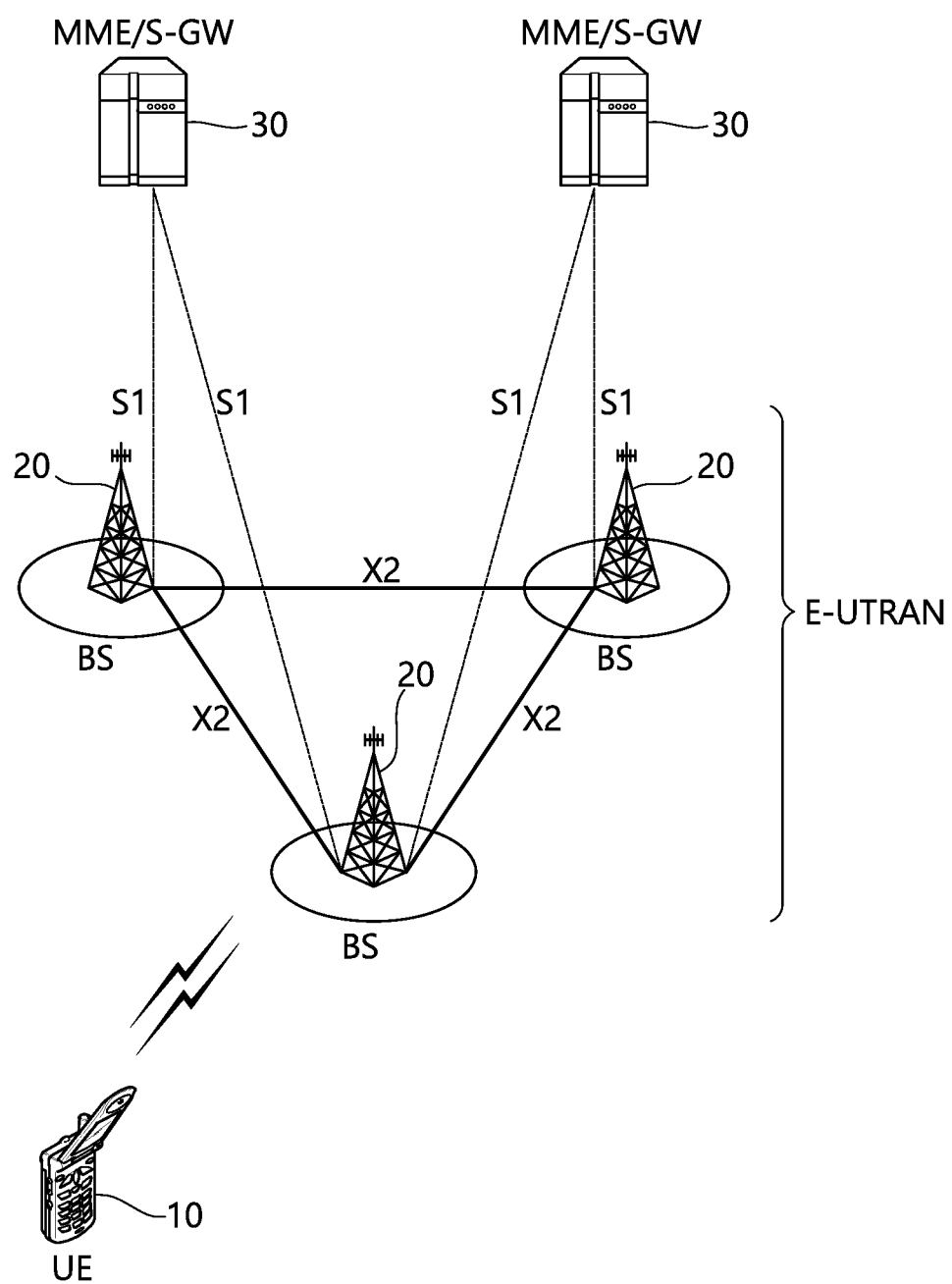
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
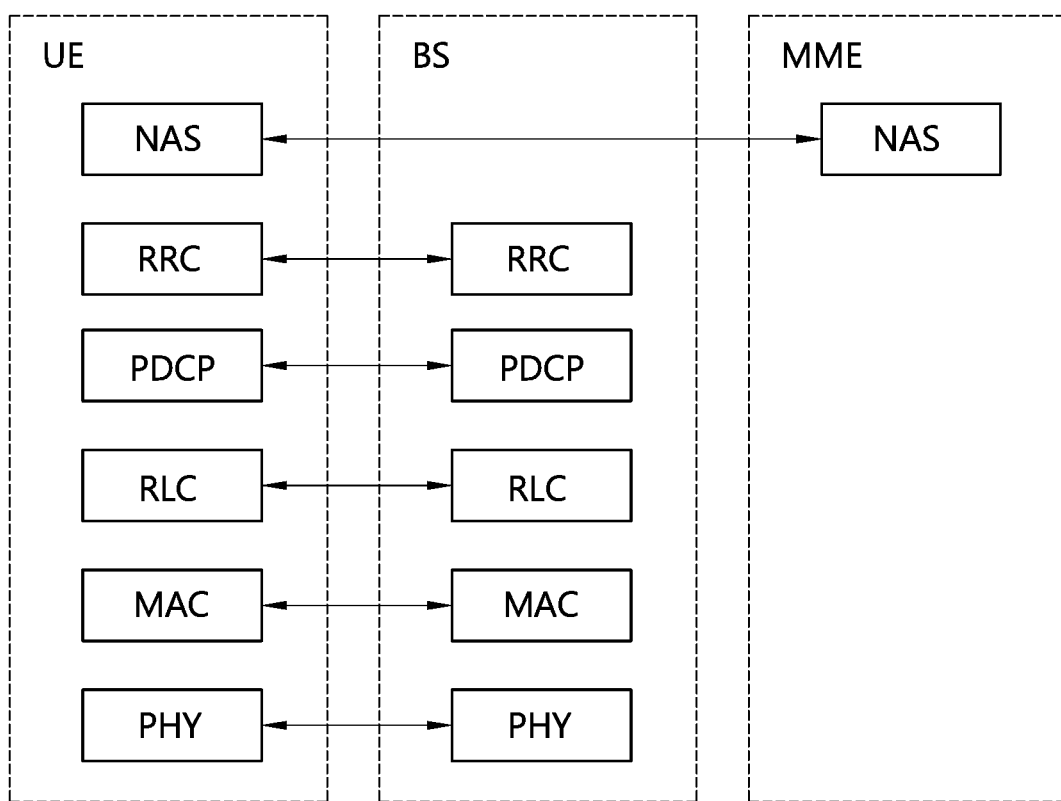
FIG. 2 shows a control plane of a radio interface protocol of an LTE system.
Figure 3:
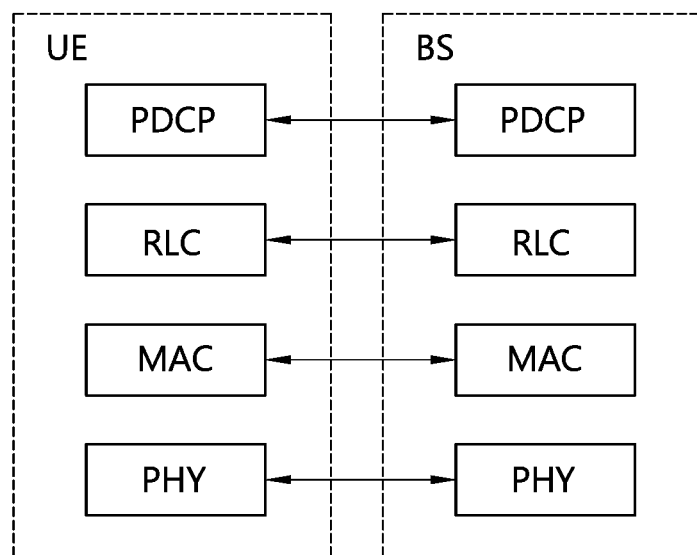
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC_connected state and an RRC_idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a D2D Operation Will be Described.

In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Hereinafter, Radio Resource Assignment for ProSe Direct Communication Will be Described.

ProSe-enabled UE may use the following two types of mode for resource assignment for ProSe direct communication.

1) Mode 1: Mode 1 is mode in which resources for ProSe direct communication are scheduled by a base station. UE needs to be in the RRC_CONNECTED state in order to send data in accordance with mode 1. The UE requests a transmission resource from the base station. The base station performs scheduling assignment and schedules resources for sending data. The UE may send a scheduling request to the base station and send a ProSe Buffer Status Report (BSR). The base station has data to be subjected to ProSe direct communication by the UE based on the ProSe BSR and determines that a resource for transmission is required.

2) Mode 2: Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with a base station or is placed in a specific cell in the RRC_IDLE state, the UE is considered to be placed within coverage of the base station. If UE is placed outside coverage, only mode 2 may be applied. If the UE is placed within the coverage, the UE may use mode 1 or mode 2 depending on the configuration of the base station. If another exception condition is not present, only when a base station performs a configuration, UE may change mode from mode 1 to mode 2 or from mode 2 to mode 1.

Figure 4:
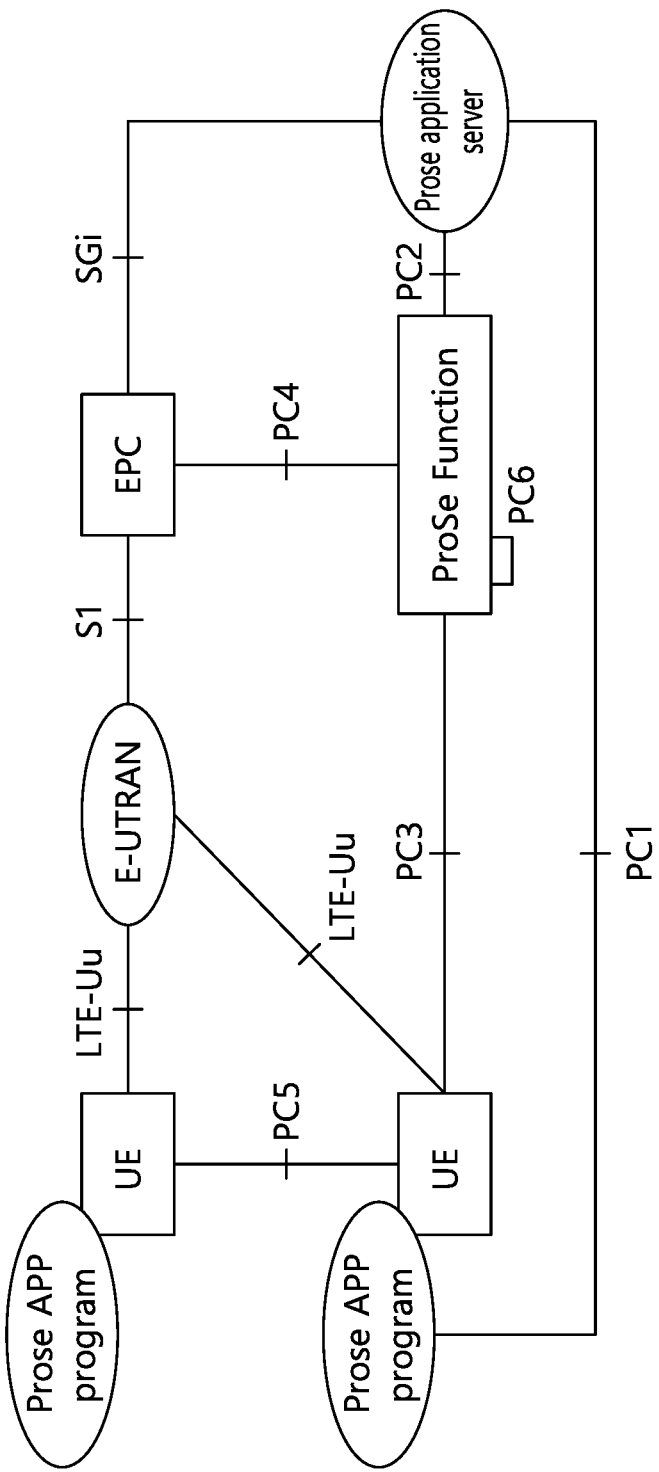
FIG. 4 shows a reference structure for a ProSe.

FIG. 4 shows a reference structure for a ProSe.

Referring to FIG. 4, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a Reference Point and a Reference Interface Will be Described in a Reference Structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, ProSe Direct Communication (D2D Communication) is described.

The ProSe direct communication is a communication mode where two public safety UEs may perform direct communication through a PC 5 interface. The communication mode may be supported in both of a case of receiving a service in coverage of E-UTRAN or a case of separating the coverage of E-UTRAN.

Hereinafter, Vehicle-to-Everything (V2X) Communication is Described.

Figure 5:
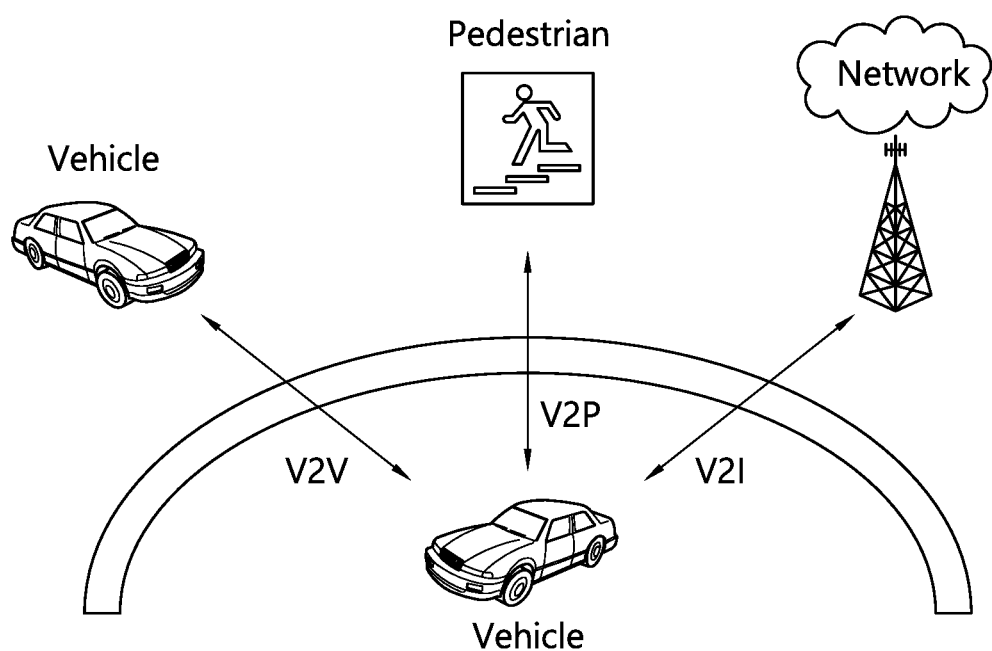
FIG. 5 is a diagram illustrating a V2X communication environment.

FIG. 5 is a diagram illustrating a V2X communication environment.

V2X is a technology that continuously communicates with a road infra or another vehicle while running a vehicle by adding mobility to D2D technology to exchange and share valuable information such as traffic situation. Researches and studies for supporting Vehicle-to-Vehicle (V2V) communication, Vehicle-to-Infrastructure (V2I) communication, Vehicle-to-Pedestrian (V2P) communication, Vehicle-to-Network (V2N) communication through evolution of connectivity function has been performed.

According to V2X communication, a vehicle continuously broadcasts a position, speed, and a direction of the vehicle. Peripheral vehicles receiving the broadcasted information recognize movement of peripheral vehicles to use accident prevention. That is, similar to a case where a person has a UE in the form of a smart phone or a smart watch, a UE of a specific form may be installed in each vehicle. In this case, a UE installed at a vehicle is a device for receiving a real communication service from a communication network. For example, the UE installed at the vehicle may access a base station in an E-UTRAN to receive a communication service.

Meanwhile, before describing a suggested V2X, a plurality of terms to be used in the specification is firstly defined.

RSU (Road Side Unit): The RSU is an entity for supporting V2I communication, and means an entity capable of performing transmission and reception to and from a UE using a V2I application. The RSU may be configured by a base station or a UE (particularly, stationary UE). The base station or the UE operating as the RSU collects information (e.g., traffic light information, traffic volume information, and the like) on traffic safety and/or information regarding movement of peripheral vehicles, and transmits information to other UEs being a communication target or receives information from other UEs.

V2I communication: V2I communication is a type of V2X communication. A UE and an RSU using the V2I application becomes a subject of the V2I communication.

V2N communication: V2N communication is a type of V2X communication. A UE and a serving entity using a V2N application becomes a subject of the V2N communication, and the UE and the serving entity communicate with each other through an LTE network entity.

V2P communication: V2P communication is a type of V2X communication. Two UE using a V2P application become a subject of the V2P communication.

V2V communication: V2V communication is a type of V2X communication. Two UE using a V2V application become a subject of the V2V communication. The difference of V2V communication from V2P communication is in that one UE becomes a UE of a pedestrian in the V2P communication, and one UE becomes a UE of a vehicle in the V2V communication.

Un interface: The Un interface means an interface between a relay node and a base station, which is an interface used in transmission/reception achieved in MBSFN (MBMS (Multimedia Broadcast/Multicast Services) over Single Frequency Network) sub-frame.

PC5 interface: The PC5 interface means an interface used in direct communication between two UEs, which is an interface used for communication between devices for supporting a Proximity Service (ProSe).

In this disclosure, D2D communication, D2D direct communication, V2X communication, sidelink communication, sidelink V2V communication, ProSe direct communication, and the like, may be used as having the same concept. Hereinafter, for the purposes of description, V2V communication will be mainly described, but the technical concept of the present invention is not limited to V2V communication and may be applied various D2D communication having mobility.

In the case of sidelink V2V communication mode 1, semi-persistent scheduling may be supported by a base station (BS) (or eNB). The sidelink V2V communication mode 1 may refer to a communication mode in which a UE is scheduled for resources for D2D direct communication from the BS. That is, the BS may allocate a set of periodically occurring resources for sidelink scheduling assignment (SA) and/or data transmission. However, since the UE may change the BS, if the BS allocates a set of resources periodically generated, the following problems may arise. This will be described in detail hereinafter.

Figure 6:
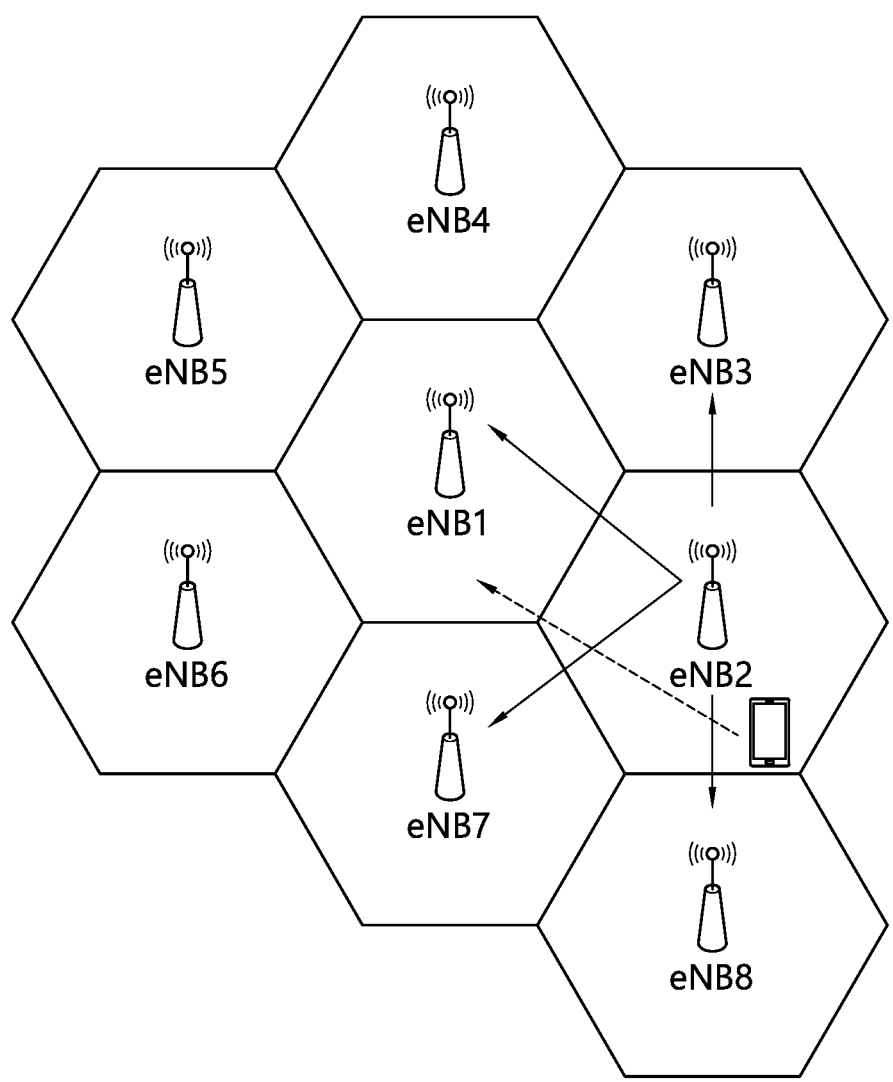
FIG. 6 shows a problem that may arise when a base station (BS) (or eNB) allocates a set of periodically occurring resources.

FIG. 6 is a diagram for explaining a problem that may arise when a BS allocates a set of periodically occurring resources.

Referring to FIG. 6, eNB2 may provide a set of resources allocated by the eNB2 which periodically occur to neighbor eNBs such as eNB1, eNB3, eNB7, and eNB8. Therefore, a UE located in the eNB2 may smoothly transmit a V2X message although the eNB is changed. However, problems may arise if eNB1 cannot provide the set of resources received from eNB2. In case where the eNB1 cannot provide the set of resources received from the eNB2, if the eNB2 does not know the situation, the UE which has moved to the area of the eNB1 may not be able to transmit a V2X message until a set of resources newly allocated by the eNB1 is received. For example, in case where the eNB2 has provided a first resource set allocated by the eNB2 to the eNB1, as a neighbor eNB, but the eNB1 cannot provide the allocated first resource set, the UE which has moved to the area of the eNB1, cannot transmit a V2X message using the first resource set.

Hereinafter, a method of performing a V2X communication by a BS and a device supporting the same according to an embodiment of the present invention will be described in detail.

<First Solution>

The target BS receiving the resource set for V2X communication from the source BS may determine whether it can serve the resource set. The resource set may be a resource set for sidelink scheduling assignment and/or data transmission. The resource set may be a set of resources that occur periodically. The resource set may include only one resource set. Alternatively, the resource set may include a plurality of resource sets.

If the target BS determines that it cannot serve the resource set, the target BS may newly allocate a resource set for V2X communication. Also, the target BS may inform the source BS of the newly allocated resource set. Information related to the newly allocated resource set may be informed to the source BS by a new message, an existing message, a new IE included in a new message, or a new IE included in an existing message.

The source BS may be a BS that allocates and provides the resource set, and the target BS may be a BS that receives the resource set. Furthermore, the target BS may be a BS that allocates and provides a new resource set.

Figure 7:
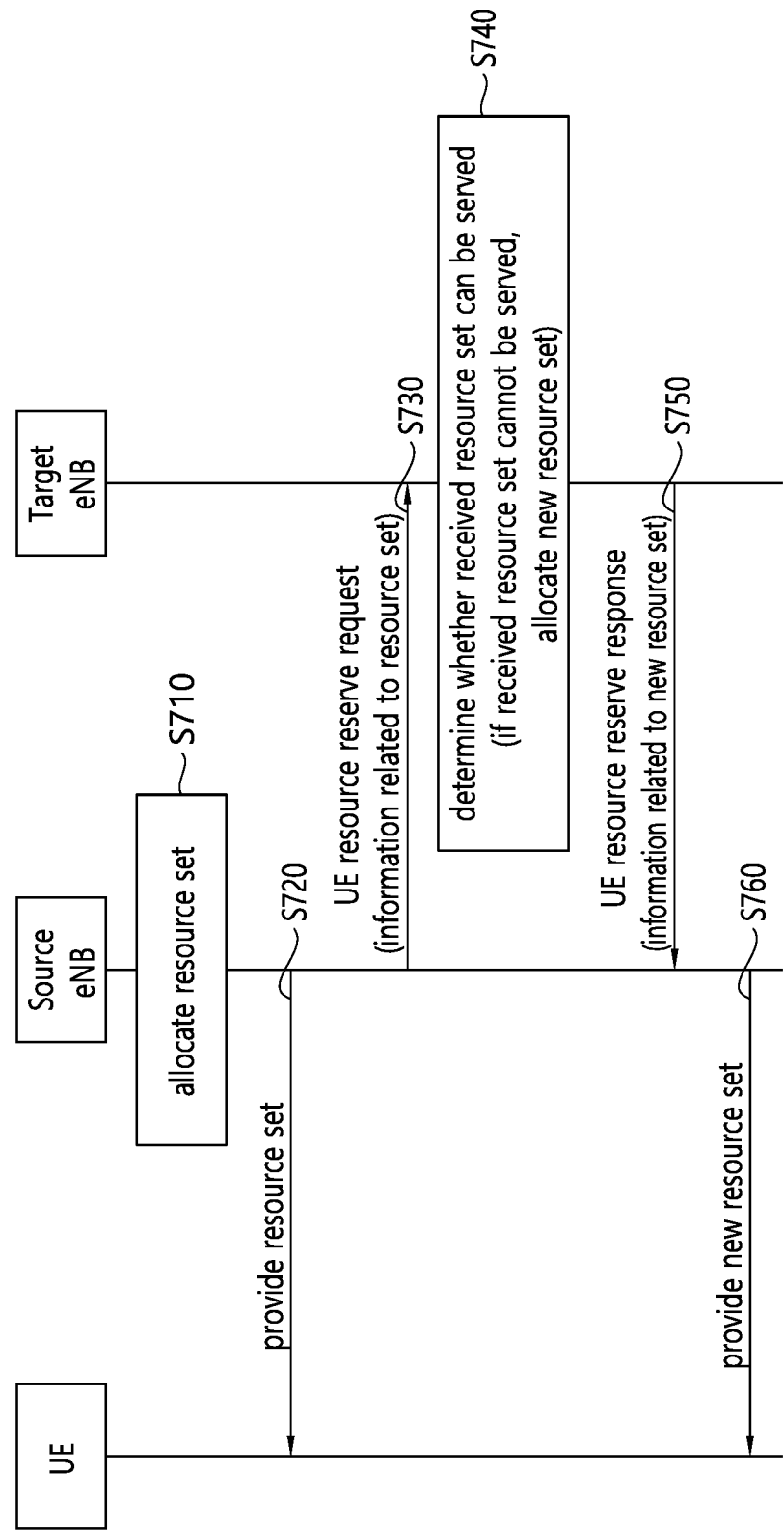
FIG. 7 shows a method of allocating a set of resources for V2X communication by a target BS according to an embodiment of the present invention.

FIG. 7 illustrates a method of allocating a resource set for V2X communication by a target BS according to an embodiment of the present invention.

Referring to FIG. 7, in step S710, a source BS may allocate a resource set for a UE. The resource set may be a set of periodically occurring resources. The resource set may include only one resource set. Alternatively, the resource set may include a plurality of resource sets.

In step S720, the source BS may transmit the resource set to the UE.

In step S730, the source BS may transmit information related to the resource set to the target BS. The information related to the resource set may be transmitted in a UE resource reserve request message, an existing message, a new IE included in a new message, or a new IE included in an existing message.

In step S740, when the target BS receives the message including the information related to the resource set, the target BS may determine whether the received resource set may be served by the target BS.

If a portion of the received resource set cannot be served by the target BS, the target BS may allocate a new resource set for the UE. Alternatively, if the entirety of the received resource set cannot be served by the target BS, the target BS may allocate a new resource set for the UE. The new resource set allocated by the target BS may include only one resource set. Alternatively, the new resource set allocated by the target BS may include a plurality of resource sets.

In operation S750, the target BS may transmit information related to the new resource set allocated by the target BS to the source BS. Information related to the new resource set allocated by the target BS may be transmitted in a UE resource reserve response message, an existing message, a new IE included in a new message, or a new IE included in an existing message.

In step S760, when the source BS receives the message including the information related to the new resource set allocated by the target BS, the source BS may transmit a new resource set received from the target BS to the UE.

According to an embodiment of the present invention, the target BS informs the source BS of the resource set which may be served by the target BS, and the source BS informs the UE of the resource set which may be served by the target BS, whereby the UE may seamlessly perform V2X communication although the UE moves to the target BS.

<Second Solution>

The target BS receiving the resource set for V2X communication from the source BS may determine whether the resource set may be served. The resource set may be a resource set for sidelink scheduling assignment and/or data transmission. The resource set may be a set of resources that occur periodically. The resource set may include only one resource set. Alternatively, the resource set may include a plurality of resource sets.

If the target BS determines that the target BS cannot serve the resource set, the target BS may transmit, to the source BS, an indication indicating that the resource set cannot be served by the target BS. Then, the source BS may newly allocate a resource set for V2X communication. Thereafter, the source BS may inform the target BS of the newly allocated resource set. The indication may be informed to the source BS by a new message, an existing message, a new IE included in a new message, or a new IE included in an existing message. The information related to the newly allocated resource set may be informed to the target BS by a new message, an existing message, a new IE included in a new message, or a new IE included in an existing message.

The source BS may refer to a BS that allocates and provides the resource set, and the target BS may refer to a BS that receives the resource set. Further, the source BS may be a BS that allocates and provides a new resource set.

Figure 8:
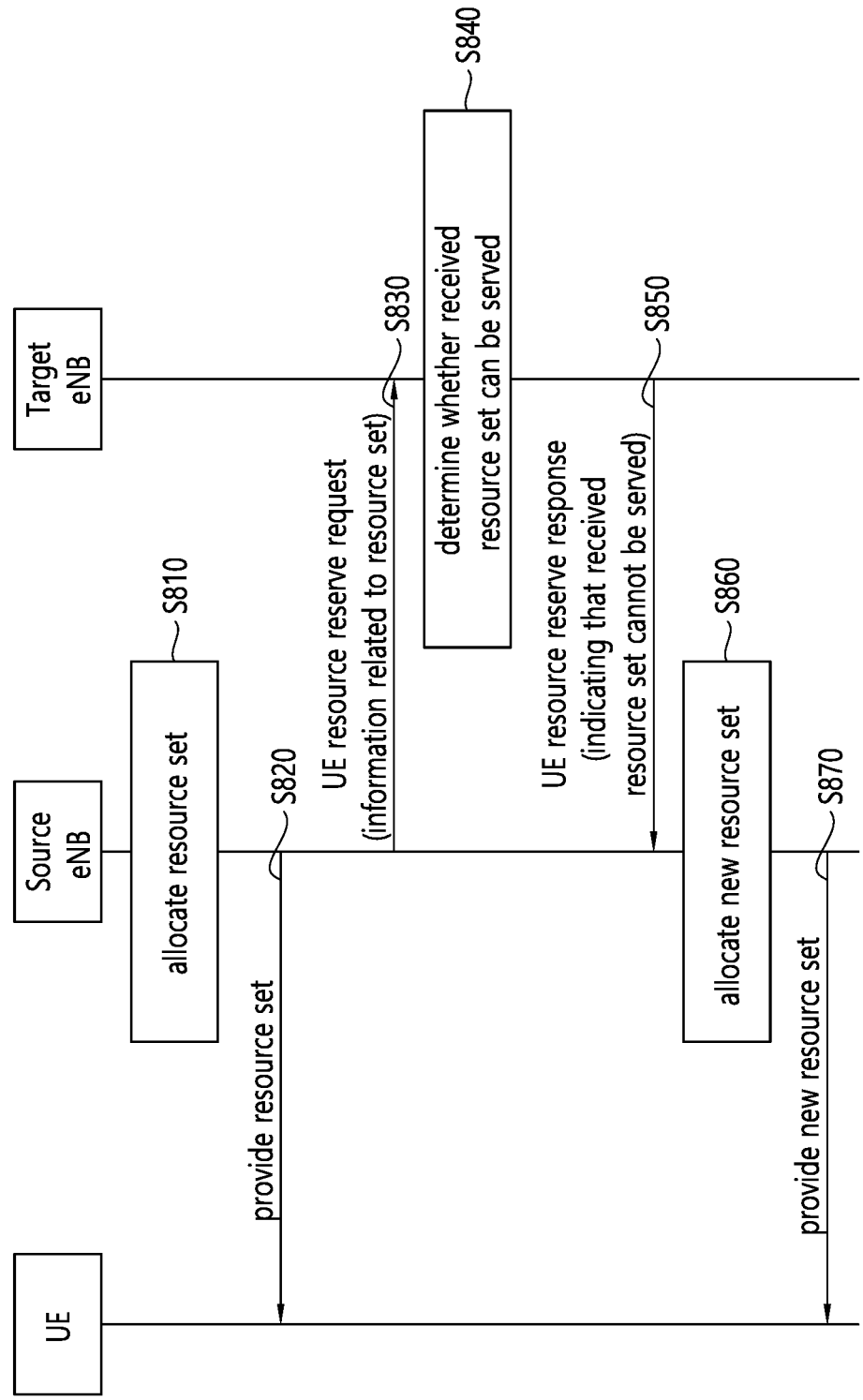
FIG. 8 shows a method of allocating a set of resources for V2X communication by a source BS according to an embodiment of the present invention.

FIG. 8 illustrates a method of allocating a resource set for V2X communication by a source BS according to an embodiment of the present invention.

Referring to FIG. 8, in step S810, the source BS may allocate a resource set for a UE. The resource set may be a set of resources that occur periodically. The resource set may include only one resource set. Alternatively, the resource set may include a plurality of resource sets.

In step S820, the source BS may transmit the resource set to the UE.

In step S830, the source BS may transmit information related to the resource set to the target BS. The information related to the resource set may be transmitted in a UE resource reserve request message, an existing message, a new IE included in a new message, or a new IE included in an existing message.

In step S840, when the target BS receives a message including the information related to the resource set, the target BS may determine whether the received resource set may be served by the target BS.

In step S850, if the target BS determines that the received resource set cannot be served by the target BS, the target BS may transmit an indication indicating that the received resource set cannot be provided by the target BS to the source BS. The indication may be transmitted in a UE resource reserve response message, an existing message, a new IE included in a new message, or a new IE included in an existing message.

If the target BS determines that a specific resource set among the received resource sets cannot be served by the target BS, the target BS may transmit an indication indicating that the received resource set cannot be provided by the target BS and a list of the specific resource set that cannot be served by the target BS to the source BS. The indication and the list of the specific resource sets may be transmitted in a UE resource reserve response message, an existing message, a new IE included in a new message, or a new IE included in an existing message.

In step S860, when the source BS receives a message including the indication (additionally, the list of the specific resource sets), the source BS may allocate the new resource set for the UE. The new resource set allocated by the source BS may include only one resource set. Alternatively, the new resource set allocated by the source BS may include a plurality of resource sets.

If the message includes the list of the specific resource sets, the source BS may allocate the new resource set for the UE. In this case, the number of new allocated resource sets may be equal to the number of resource sets included in the list of the specific resource sets.

In addition, the source BS may transmit information related to the new resource set allocated by the source BS to the target BS. Information related to the new resource set allocated by the source BS may be transmitted in a UE resource reserve request message, an existing message, a new IE included in a new message, or a new IE included in an existing message.

In step S870, the source BS may transmit a new resource set allocated by the source BS to the UE.

According to an embodiment of the present invention, the target BS informs the source BS that the resource set allocated by the source BS cannot be provided, and the source BS allocates a new resource set for the UE, whereby V2X communication may be performed seamlessly even when the UE moves to the target BS.

Figure 9:
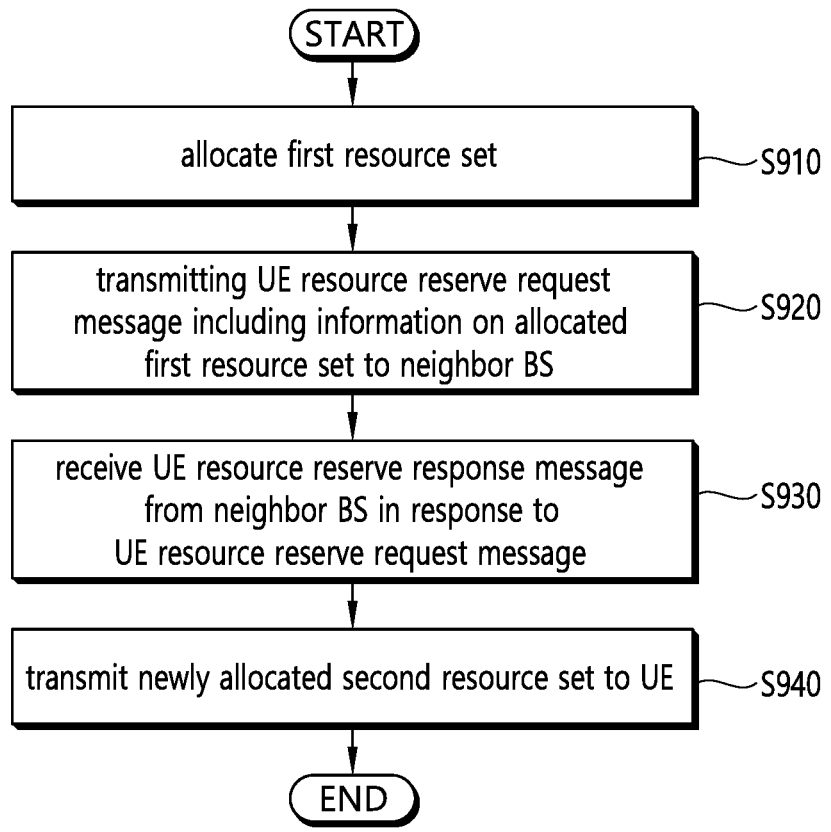
FIG. 9 is a flowchart illustrating a method of performing V2X communication by a BS according to an embodiment of the present invention.

FIG. 9 is a flowchart illustrating a method of performing V2X communication by a BS according to an embodiment of the present invention.

Referring to FIG. 9, in step S910, the BS may allocate a first resource set. The allocated first resource set cannot be served by a neighbor BS.

In step S920, the BS may transmit a UE resource reserve request message including information on the allocated first resource set to a neighbor BS.

In step S930, the BS may receive a UE resource reserve response message from the neighbor BS in response to the UE resource reserve request message.

The UE resource reserve response message may include information on the newly allocated second resource set. The second resource set may be newly allocated by the neighbor BS.

The UE resource reserve response message may include an indication indicating that the allocated first resource set cannot be served by the neighbor BS. In this case, the BS may allocate a second resource set based on the indication. Further, the BS may transmit the allocated second resource set to the neighbor BS.

In step S940, the BS may transmit the newly allocated second resource set to the UE.

The first resource set and the second resource set may be periodically occurring resources for sidelink scheduling assignment (SA) or data transmission.

The allocated first resource set may be a plurality of first resource sets. At least any one of the plurality of first resource sets cannot be served by the neighbor BS.

Figure 10:
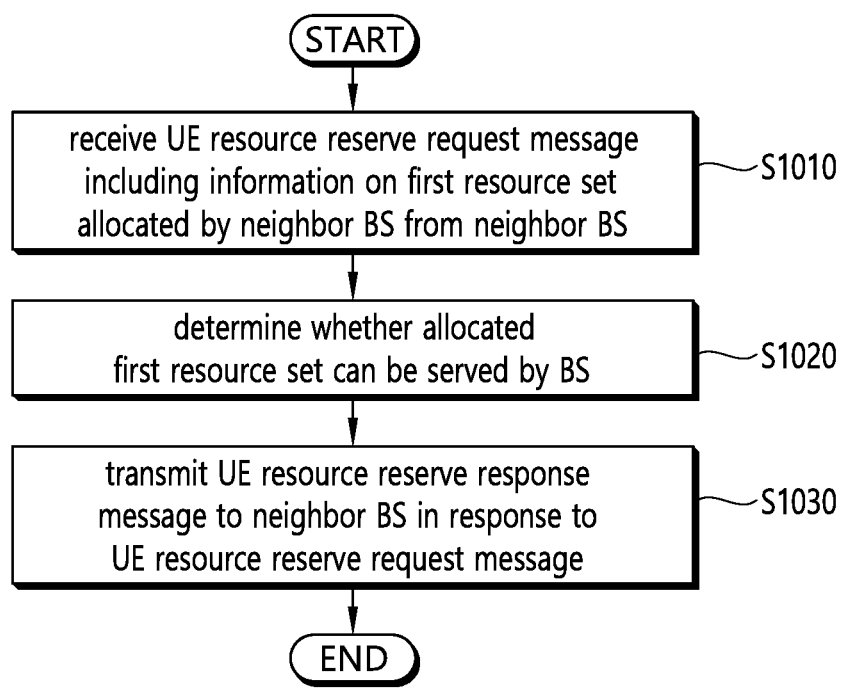
FIG. 10 is a flowchart illustrating a method of performing V2X communication by a BS according to an embodiment of the present invention.

FIG. 10 is a flowchart illustrating a method of performing V2X communication by a BS according to an embodiment of the present invention.

Referring to FIG. 10, in step S1010, the BS may receive a UE resource reserve request message including information on a first resource set allocated by a neighbor BS from the neighbor BS.

In step S1020, the BS may determine whether the allocated first resource set can be served by the BS.

In step S1030, the BS may transmit a UE resource reserve response message to the neighbor BS in response to the UE resource reserve request message.

If it is determined that the allocated first resource set cannot be served by the BS, the BS may allocate a second resource set. In this case, the UE resource reserve response message may include information on the allocated second resource set.

Alternatively, if it is determined that the allocated first resource set cannot be served by the BS, the UE resource reserve response message may include an indication indicating that the allocated first resource set cannot be served by the BS.

Figure 11:
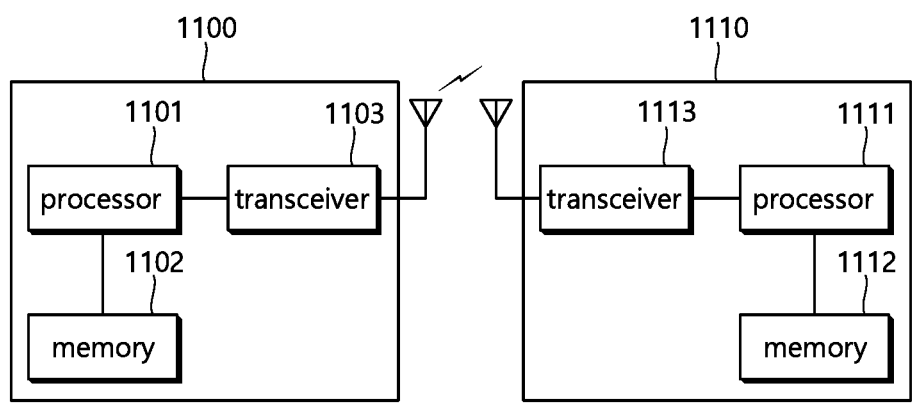
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods may be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block may be implemented in a different order, or may be performed simultaneously with other steps or blocks. In addition, those ordinarily skilled in the art may know that the invention is not limited to each of the steps or blocks, and at least one different step may be added or deleted without departing from the scope and spirit of the invention.

The aforementioned embodiment includes various examples. It should be noted that those ordinarily skilled in the art know that all possible combinations of examples cannot be explained, and also know that various combinations may be derived from the technique of the present specification. Therefore, the protection scope of the invention should be determined by combining various examples described in the detailed explanation, without departing from the scope of the following claims.

What is claimed is:

1. A method for performing vehicle-to-everything (V2X) communication by a base station (BS) in a wireless communication system, the method comprising:
   allocating a first resource set;
   transmitting a user equipment (UE) resource reserve request message including first information related to the first resource set to a neighbor BS;
   receiving a UE resource reserve response message from the neighbor BS in response to the UE resource reserve request message,
   wherein the UE resource reserve response message includes second information informing the BS that at least one resource included in the first resource set cannot be served by the neighbor BS, and
   wherein the UE resource reserve response message includes a list of the at least one resource that cannot be served by the neighbor BS;
   allocating a second resource set based on the second information,
   wherein a number of resources in the second resource set is equal to a number of resources included in the list of the at least one resource; and
   transmitting the second resource set to a UE.

2. The method of claim 1, wherein the first resource set cannot be served by the neighbor BS.

3. The method of claim 1, further comprising:
   transmitting the second resource set to the neighbor BS.

4. The method of claim 1, wherein the first resource set and the second resource set are periodically occurring resources for sidelink scheduling assignment (SA) or data transmission.

5. A base station (BS) performing vehicle-to-everything (V2X) communication in a wireless communication system, the BS comprising:
   a memory;
   a transceiver; and
   a processor, operatively connected with the memory and the transceiver, that:
   allocates a first resource set,
   controls the transceiver to transmit a user equipment (UE) resource reserve request message including first information related to the first resource set to a neighbor BS,
   controls the transceiver to receive a UE resource reserve response message from the neighbor BS in response to the UE resource reserve request message,
   wherein the UE resource reserve response message includes second information informing the BS that at least one resource included in the first resource set cannot be served by the neighbor BS,
   wherein the UE resource reserve response message includes a list of the at least one resource that cannot be served by the neighbor BS,
   allocates a second resource set based on the second information,
   wherein a number of resources in the second resource set is equal to a number of resources included in the list of the at least one resource, and
   controls the transceiver to transmit the second resource set to a UE.

* * * * *